Nov. 26, 1929.                G. O. RESHAW                 1,737,518
                            FRUIT BASKET PACKER
                           Filed July 1, 1926         2 Sheets-Sheet 1
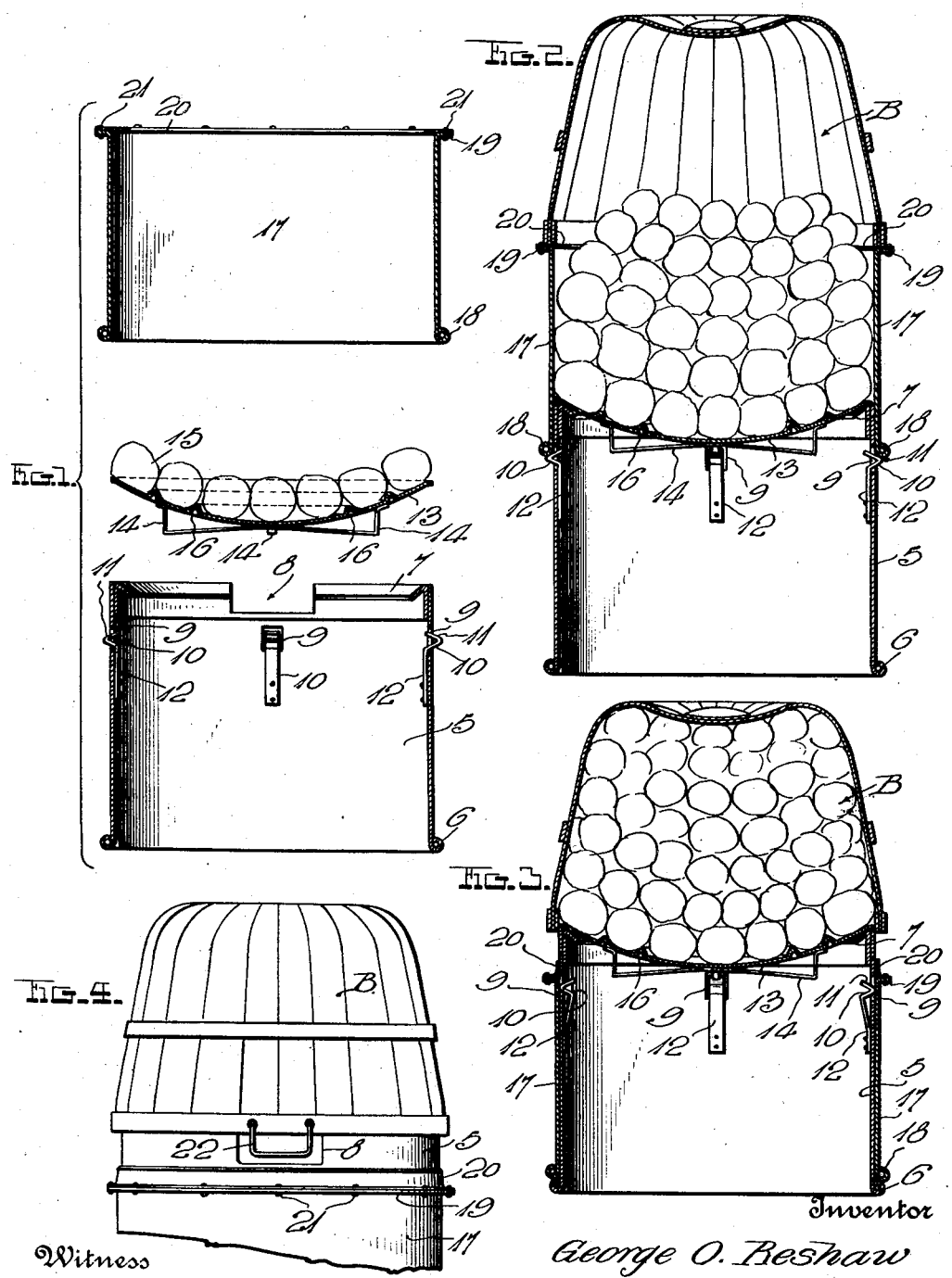
Witness
H. Woodard
Inventor
George O. Reshaw
By H. B. Willson & Co.
Attorneys Nov. 26, 1929.  G. O. RESHAW  1,737,518
FRUIT BASKET PACKER
Filed July 1, 1926  2 Sheets-Sheet 2
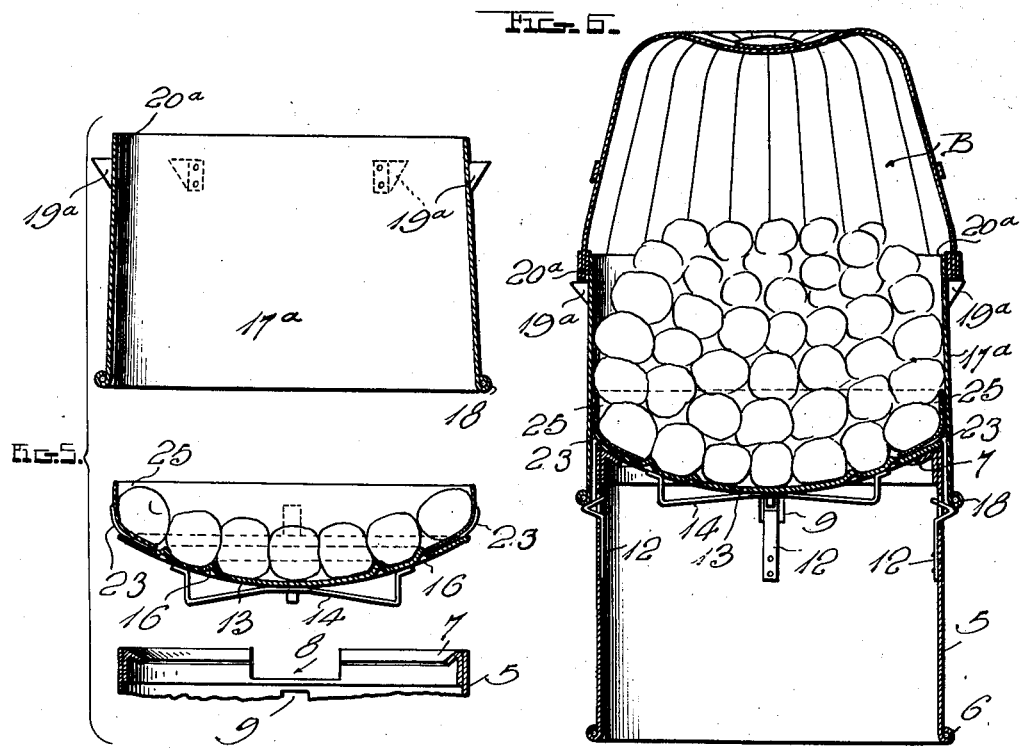
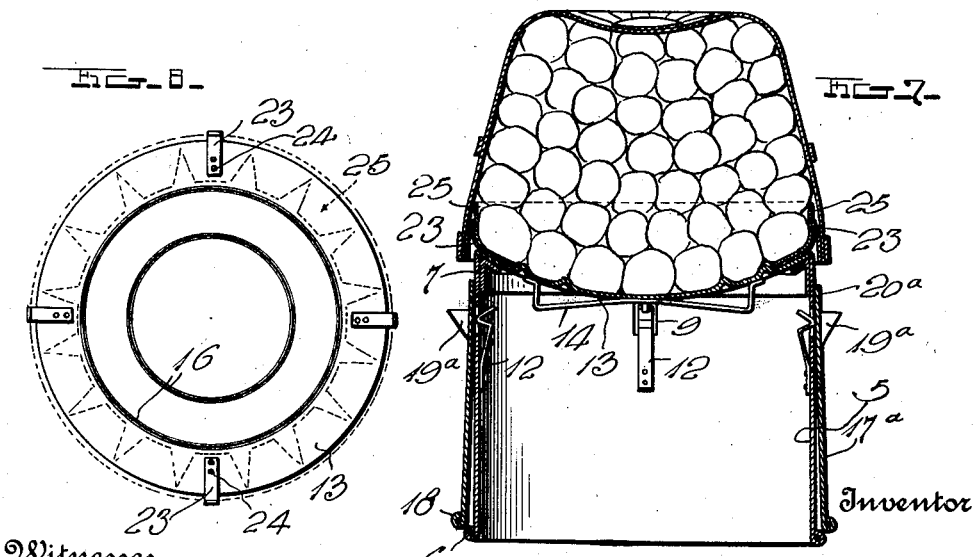
Witnesses
H. Woodard
Inventor
George O. Reshaw
By H. B. Willson & Co.
Attorneys Patented Nov. 26, 1929

1,737,518

UNITED STATES PATENT OFFICE

GEORGE O. RESHAW, OF BENTON HARBOR, MICHIGAN, ASSIGNOR TO PERFECTION PACK COMPANY, INC., OF ST. JOSEPH, MICHIGAN, A CORPORATION OF MICHIGAN

FRUIT-BASKET PACKER

Application filed July 1, 1926. Serial No. 119,908.

The invention relates to improvements in devices for effectively packing fruit in ordinary baskets such as the bushel baskets commonly employed for that purpose, and the invention relates also to a device which may be practically used for producing the desirable "ring facings" on the packed baskets, that is, the invention permits the fruit of the first layer in the basket to be packed in concentric rings so as to present a very attractive appearance when placed on display.

It is the principal object of the invention to provide a device of the class set forth which will permit quick, easy and efficient packing of baskets. To attain this end, I provide a facing disk, supporting means upon which said disk rests removably, and a vertically movable form which is normally co-operative with said facing disk to form a receptacle into which the fruit is placed. After filling of this receptacle, a fruit basket is inverted upon the upper end of the form and both the form and basket are downwardly moved with respect to the facing disk, so that the fruit previously within the form, is disposed within the basket. Then, both the basket and the facing disk are bodily removed from the packing device and may be vigorously shaken if desired to settle the fruit in the basket, while retaining the facing, that is the first layer of fruit, in orderly fashion.

A further object of the invention is to provide novel means, releasable by downward forcing of the form for normally holding said form in its raised position for co-operation with the facing disk, in forming the fruit-receiving receptacle.

Another object is to provide supporting means for the facing disk, formed with openings which give access to said disk when the form is completely lowered, thus permitting easy removal of the filled basket and the facing disk by hand.

A still further aim is to provide the upper end of the form with novel means for reception within the rim of the fruit basket, to prevent said rim from marring the fruit, when said basket and the form are downwardly forced.

Still other objects are to provide the form with a taper which effects tight packing of the fruit when said form is downwardly forced, and to provide the facing disk with novel means for holding a paper ring in place, so that such ring will form an ornamental ring around the first layer of packed fruit.

With the foregoing and minor objects in view, the invention resides in the novel subject matter hereinafter described and claimed, the description being supplemented by the accompanying drawings.

Fig. 1 is a sectional view of the device showing the base, the form and the facing disk in disassembled relation and illustrating fruit upon said facing disk.

Fig. 2 is a vertical sectional view showing the case, facing disk and form in assembled relation illustrating the receptacle provided by said facing disk and form, resting upon the upper edge of the form, so that said basket and form are in readiness for downward forcing to position the fruit within the basket.

Fig. 3 is a view similar to Fig. 2 but illustrating the form and the basket in lowered position, so that the basket and the facing disk are in readiness to be bodily removed from the base.

Fig. 4 is a fragmentary side elevation showing the parts in the positions of Fig. 3 and illustrating the manner in which access is had to the facing disk, when the packing form is lowered.

Fig. 5 is a view similar to Fig. 1 but showing a different form of construction.

Figs. 6 and 7 are views similar to Figs. 2 and 3 but showing the construction of Fig. 5.

Fig. 8 is a plan view of the facing disk of Figs. 5, 6 and 7 showing the provision for holding the paper ring.

The drawings above briefly described, may be considered as disclosing preferred forms of the invention and while the construction depicted will be hereinafter rather specifically described, it is to be understood at the outset, that within the scope of the invention as claimed, numerous changes may be made.

The numeral 5 designates a cylindrical wall constituting a base or support, the lower end of this wall being preferably provided with a reinforcing bead 6, while its upper end is equipped with an inwardly declined flange 7 which may well be formed by a portion of an angle metal ring suitably secured to said wall. At two opposed points, the wall 5 is formed with notches 8 which extend also through the flange 7, said notches opening through the upper end of said wall. Near said upper end of the wall 5, the latter is formed with a plurality of openings 9, and spring-pressed detents 10 project outwardly through these openings, said detents having outwardly declined upper surfaces 11. These detents are preferably carried by spring arms 12 whose lower ends are suitably secured against the inner side of the wall 5.

13 designates a concave facing member or disk having suitable supporting feet 14 which may rest upon a fruit packing table or the like so as to hold said disk in a horizontal position while the first layer 15 of the fruit is being placed upon the disk, and for speed of operation, each one of the packing devices may be provided with a plurality of the disks 13, so that while one is being used in the packing device, another disk may have its layer of fruit applied. Preferably, the disk 13 is provided with concentric upstanding ridges 16 which provide depressions in which to ring-pack the fruit 15.

The disk or facing member 13 and its layer of fruit, are placed upon the flange 7 as shown in Fig. 2, and a cylindrical packing form or confining member 17 then co-operates with the disk in forming a receptacle in which to pack or otherwise place the rest of the fruit to be eventually confined in the basket or other packing receptacle B. The form 17 slidably surrounds the upper end of the wall 5 and in the present showing, is provided with a bead 18 which rests upon the outwardly declined upper surfaces 11 of the detents 10. In the construction disclosed, the upper end of the form 17 is provided with an outstanding rest or flange 19, and a ring 20 of rubber or other elastic material may, if desired, be suitably secured upon this flange, for instance by rivets 21.

After filling of the receptacle 13—17 with the fruit, the basket B is inverted upon the form 17 as shown in Fig. 2, the ring 20 then projecting inwardly beyond the rim of said basket. By now downwardly forcing the basket B and the form 17, the surfaces 11 of the detents 10 cause inward movement and consequent release of these detents, so that the form and basket may be depressed until the fruit previously in said receptacle is positioned in the basket B. During downward movement of the basket and form, the ring 20 turns upwardly within the basket rim and thus prevents said rim from marring any of the fruit. When the basket reaches the limit of its downwardly movement, the form 17 may be still further depressed, so as to expose the notches 8, as seen in Fig. 4. Then, the operator may insert his fingers through these notches, permitting him to hold the basket B and the facing disk 13 in assembled relation, so that said disk and the packed basket may be bodily removed from the base 5. When the basket is now righted, it may be vigorously shaken from side to side while holding the disk 13 in place, so as to effect settling of the fruit, at the same time, causing the disk to retain the facing of the fruit, that is the first layer, in its originally packed condition. The disk 13 is then removed and the basket cover applied in the usual way.

22, in Fig. 4, merely represents one of the usual handles of the basket B, these handles being preferably, although not necessarily, positioned opposite the notches 8. It will also be seen from this view and from Fig. 3, that the yieldable ring 20 curves upwardly and surrounds the base or support 5, when the form 17 is lowered. This form may remain in this lowered position until another disk 13 and a facing of fruit thereon, are applied to the flange 7. Then, the form 17 is again raised into co-operative relation with the disk 13 and is so held by the detents 10.

In the form of construction shown in Figs. 6 to 8, a number of the parts are of the same formation as above described and hence the same reference characters herein before used with respect thereto have been applied to these views also. The receiver or confining member 17ª is of slightly different form. This receiver is upwardly tapered so that its upper edge portion 20ª may be received in the basket B, and said receiver is provided with outwardly projecting means such as the rests or lugs 19ª to engage and support the basket rim. By upwardly tapering this receiver, it causes inward forcing of the fruit when the receiver and basket are forced downwardly, thus effecting tighter packing than can otherwise be obtained.

Figs. 5 to 8 also disclose substantially L-shaped, spring metal brackets 23 having their base portions secured upon the facing disks 13 by screws or other desired means 24. These spring brackets may be utilized to hold a paper ring 25 in place upon the facing disk while the first layer of fruit is being positioned on said disk, as will be clear from Fig. 5, and when the basket B is fully packed and the facing disk removed, said ring 25 will remain in place, forming an ornamental border around the first layer of the packed fruit.

The form of construction last described is operated in the same manner as that first explained and it will be seen that by having the upper end 20ª of the form 17ª fitted within the basket rim, marring of the fruit by contact with said rim will be prevented. The upward taper of the form 17ª serves to force the fruit inwardly as the form is lowered, thus effecting tight packing and the brackets 23 form effective means for holding the paper ring 25 in place.

While the facing layer of fruit may be placed on the facing member or disk 13 before the packing form or confining member 17 or 17ª is placed around it, as above described, it will be seen that this is not necessary since a plurality of pairs of facing disks and packing forms may be supplied with each base or support 5, and the facing disks may be placed on a table or the like with the forms around them before the fruit is placed in position. After these assembled forms and disks are filled with fruit, they may be moved to the base or support 5, care being taken to hold the disks in the forms when they are lifted and moved.

It will be seen from the foregoing that while the invention is exceptionally simple and inexpensive, it will be efficient and will permit not only rapid, but proper packing of the fruit in the basket.

I claim:—

1. A fruit basket packer comprising a base and having openings near its upper end, spring-pressed detents projecting outwardly through said openings and having outwardly declined upper surfaces, a cylindrical packing form slidably surrounding said base and resting upon said declined surfaces of said detents, and a facing disk removably supported by the upper end of said base and co-operating with said form in providing a receptacle in which to pack the fruit, the upper end of said form serving to support an inverted fruit basket, whereby downward movement of the form and basket will dispose the latter around the fruit, said form being downwardly movable to a position at which it gives access to said facing disk, permitting the latter and the filled basket to be bodily removed.

2. In a fruit packer, a facing disk having attached substantially L-shaped brackets adapted for use to hold a paper ring in place for the purpose set forth.

3. A fruit basket packer comprising a facing disk, supporting means upon which said disk rests removably, and a form slidably surrounding said facing disk and when raised co-operable with the same in forming a receptacle in which to place the fruit, provision being made for holding said form in said raised position and for permitting rapid downward pushing thereof when desired, said downward movement permitting transfer of the fruit from the form into a basket inverted thereon; said form being decreased in diameter toward its upper end to inwardly crowd and pack the fruit as the form and basket are downwardly forced.

4. In a fruit packer, a facing disk having upstanding circumferentially spaced portions adapted for use to hold a paper ring in place for the purpose set forth.

5. In a fruit packer, a support, a packing form slidably mounted thereon and having means projecting laterally from its upper portion for supporting a basket in an inverted position, and means releasable by downward forcing of the form and basket, to normally support the form in operative position.

6. In a fruit packer, a support, a packing form slidably mounted theron and having means projecting laterally from its upper portion for supporting a basket in an inverted position, spring actuated detents for normally supporting the form in operative position, said detents being releasable by downward forcing of the form and the basket thereon.

In testimony whereof I have hereunto affixed my signature.

GEORGE O. RESHAW.